US012697542B2

(12) United States Patent
Hong et al.

(10) Patent No.: US 12,697,542 B2
(45) Date of Patent: Aug. 4, 2026

(54) LOW-DELAY MULTI-PASS FRAME-LEVEL RATE CONTROL USING A SHARED REFERENCE FRAME

(71) Applicant: GOOGLE LLC, Mountain View, CA (US)

(72) Inventors: Danny Hong, New York, NY (US); Ramachandra Tahasildar, Cupertino, CA (US); Alex Sukhanov, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 181 days.

(21) Appl. No.: 18/559,200

(22) PCT Filed: Aug. 12, 2022

(86) PCT No.: PCT/US2022/040218
§ 371 (c)(1),
(2) Date: Nov. 6, 2023

(87) PCT Pub. No.: WO2023/022943
PCT Pub. Date: Feb. 23, 2023

(65) Prior Publication Data
US 2024/0226731 A1 Jul. 11, 2024

Related U.S. Application Data

(60) Provisional application No. 63/233,603, filed on Aug. 16, 2021.

(51) Int. Cl.
*A63F 13/355* (2014.01)
*A63F 13/358* (2014.01)
*G06T 9/00* (2006.01)

(52) U.S. Cl.
CPC .......... *A63F 13/355* (2014.09); *A63F 13/358* (2014.09); *G06T 9/00* (2013.01)

(58) Field of Classification Search
None
See application file for complete search history.

(56) References Cited

U.S. PATENT DOCUMENTS 8,331,438 B2 12/2012 Chang et al.
9,615,098 B1 4/2017 Yi et al.
(Continued)

FOREIGN PATENT DOCUMENTS

CN 102883157 A 1/2013
CN 103945213 A 7/2014
(Continued)

OTHER PUBLICATIONS

International Preliminary Report on Patentability mailed Feb. 29, 2024 for PCT Application No. PCT/US2022/040218, 9 pages.
(Continued)

*Primary Examiner* — Ronald Laneau

(57) ABSTRACT

A multi-pass encoding operation using a shared reference frame is implemented to encode one or more gaming frames into a game stream. The multi-pass encoding operation includes producing a shared reference frame based upon a second-pass reference frame used by a second pass encoding of the multi-pass encoding operation. The encoding operation also includes performing a first encoding pass on a current frame using the shared reference frame. As a result of the first encoding pass, an estimated complexity for the current frame is determined. A second pass encoding is then performed on the current frame according to the second-pass reference frame and the estimated complexity, resulting in an encoded frame. This encoded frame is then transmitted as part of a stream to a client system.

22 Claims, 4 Drawing Sheets

(56) References Cited

U.S. PATENT DOCUMENTS

| | | | |
|---|---|---|---|
| 11,368,692 B2 | 6/2022 | Qiu et al. | |
| 12,301,789 B2 * | 5/2025 | Abdelkhalek | H04N 19/132 |
| 2007/0081590 A1 | 4/2007 | Goh et al. | |
| 2008/0043847 A1 | 2/2008 | Haskell et al. | |
| 2009/0074080 A1 | 3/2009 | He et al. | |
| 2010/0027622 A1 * | 2/2010 | Dane | H04N 19/59 |
| | | | 375/240.12 |
| 2014/0241421 A1 | 8/2014 | Orton-Jay et al. | |
| 2018/0310009 A1 | 10/2018 | Kopietz | |
| 2018/0324443 A1 | 11/2018 | Kudana et al. | |
| 2019/0321725 A1 | 10/2019 | Zimring et al. | |
| 2020/0137389 A1 | 4/2020 | Qiu et al. | |
| 2020/0382781 A1 | 12/2020 | Mao et al. | |
| 2021/0058630 A1 | 2/2021 | Kopietz et al. | |
| 2021/0067785 A1 | 3/2021 | Zhang et al. | |
| 2021/0194991 A1 | 6/2021 | Rickeby | |
| 2021/0235112 A1 | 7/2021 | Kopietz | |
| 2022/0132147 A1 | 4/2022 | Sun et al. | |
| 2022/0312052 A1 * | 9/2022 | Aristarkhov | H04N 21/4223 |
| 2022/0394072 A1 * | 12/2022 | Aristarkhov | H04N 19/176 |
| 2023/0013997 A1 * | 1/2023 | Hong | H04N 19/154 |
| 2023/0330533 A1 | 10/2023 | Smullen et al. | |
| 2024/0009556 A1 * | 1/2024 | Hong | A63F 13/355 |
| 2024/0348797 A1 * | 10/2024 | Mahdi | H04N 19/115 |

FOREIGN PATENT DOCUMENTS

| | | |
|---|---|---|
| CN | 112473133 A | 3/2021 |
| JP | 2007074451 A | 3/2007 |
| WO | 2014114109 A1 | 9/2013 |

OTHER PUBLICATIONS

Chiang et al. 'A New Rate Control Scheme Using Quadratic Rate Distortion Model', IEEE Transactions on Circuits and Systems for Video Technology, vol. 7, No. 1, Feb. 1997, p. 5.

Lee et al. 'Scalable Rate Control for MPEG-4 Video', IEEE Transactions on Circuits and Systems for Video Technology, vol. 10, No. 6, Sep. 2000, p. 17.

'H.264', Telecommunication Standardization Sector of ITU, Jun. 2019, 836 pages.

Grange et al. 'VP9 Bitstream & Decoding Process Specification-v0.6', Google, Inc., Mar. 31, 2016, p. 171.

International Search Report and Written Opinion mailed Nov. 25, 2022 for PCT Application No. PCT/US2022/040218, 14 pages.

European Notice of Allowance mailed Aug. 4, 2023 for EP Application No. 22764559.5, 34 pages.

Korean Allowance of Patent mailed Jan. 19, 2026 for KR Application No. 10-2023-7034787, 5 pages.

* cited by examiner

LOW-DELAY MULTI-PASS FRAME-LEVEL RATE CONTROL USING A SHARED REFERENCE FRAME

CROSS-REFERENCE TO RELATED APPLICATIONS

The present application is a U.S. National Stage under 35 U.S.C. § 371 of International Patent Application Serial No. PCT/US2022/040218, entitled "LOW-DELAY MULTI-PASS FRAME-LEVEL RATE CONTROL USING A SHARED REFERENCE FRAME" and filed on Aug. 12, 2022, which claims priority to U.S. Provisional Application No. 63/233,603, entitled "LOW-DELAY TWO-PASS FRAME-LEVEL RATE CONTROL USING A SHARED REFERENCE FRAME" and filed on Aug. 16, 2021, the entireties of which are incorporated by reference herein.

BACKGROUND

Cloud-based gaming platforms involve executing portions of or entire video game applications on remote servers to facilitate playing the video game application on a local client device. The remote servers provide audio and video rendered from executing video game applications as audio and video streams over a network to the local client device. In providing these audio and video streams, the remote servers employ the use of various encoder operations to compress gaming frames and audio in real time before they are streamed. For low-latency cloud gaming applications, it is desirable to ensure that the encoder operations do not compress a gaming frame at a number of bits that will cause the stream to need more bandwidth than the available network allows.

Unlike general video streaming applications where some delay is tolerated, cloud-based gaming requires that real-time interactivity be maintained. To address this, some cloud-based gaming platforms call for every frame to be encoded very close to a target frame size that matches the currently available network bandwidth. Encoding the game frame at a size other than the target frame size can result in either undershooting (resulting in less bits than allowed) or overshooting (resulting in more bits than allowed), with overshooting potentially leading to packet losses and delays that degrade the gaming experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

SUMMARY OF EMBODIMENTS

Figure 1:
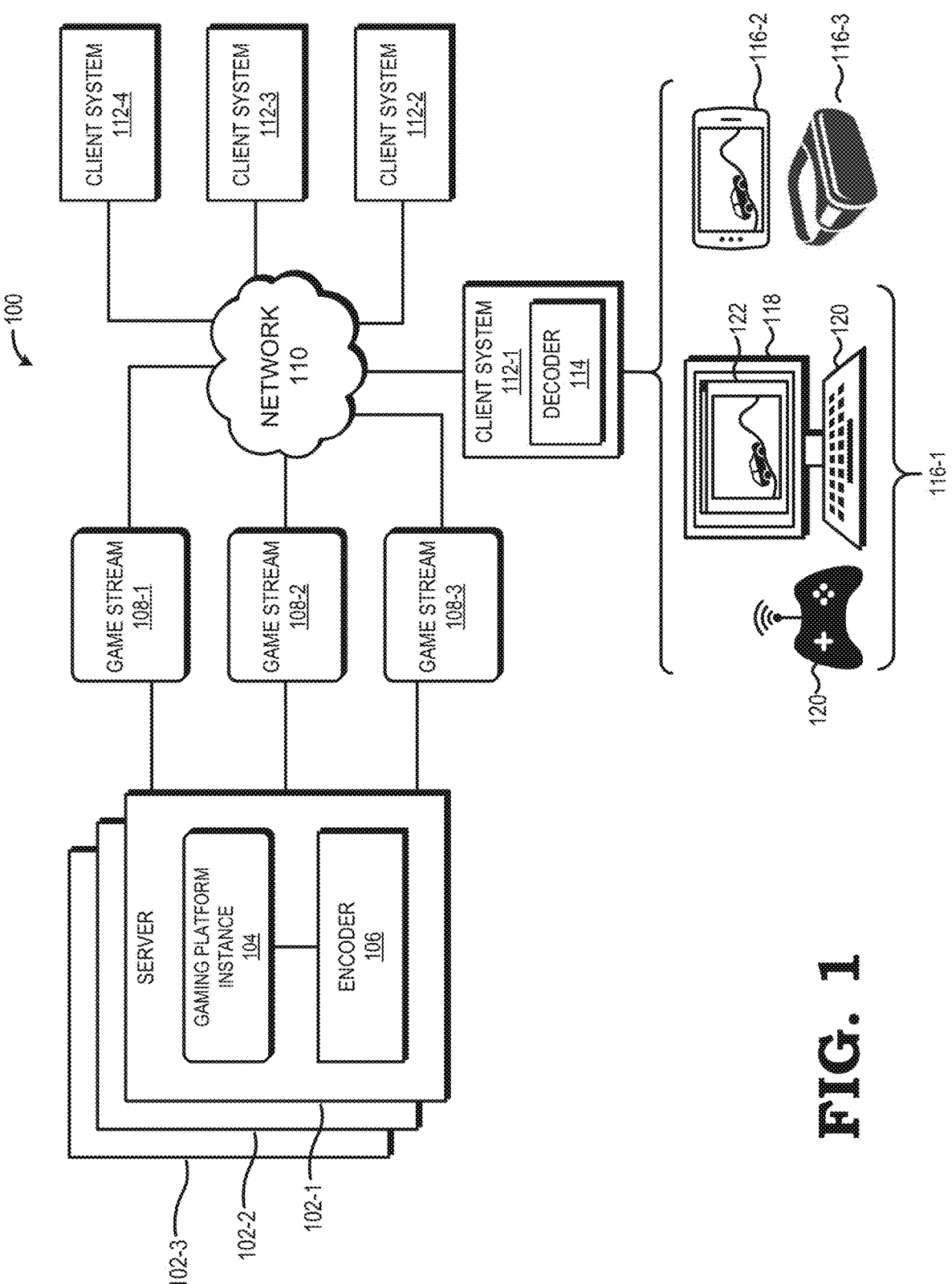
FIG. 1 is a block diagram of a cloud-based gaming system employing a multi-pass encoding technique using one or more shared reference frames, in accordance with some embodiments.

Techniques and systems described herein are directed to a multi-pass encoding operation using a shared reference frame. According to an example embodiment, a computer-implemented method can include comparing a first-pass resolution of a first pass encoding of a multi-pass (e.g., two-pass) encoding process to a second-pass resolution of a second pass encoding of the multi-pass encoding process. Additionally, the method can include retrieving a second-pass reference frame associated with the second pass encoding based on the comparison so as to produce a shared reference frame. This might for example refer to the method including retrieving a second-pass reference frame used in the second pass encoding of a first game frame to be encoded and either, based on the comparison of the resolutions, using the second-pass reference frame as a first-pass reference frame for use in the first pass encoding of the first game frame or adapting the second-pass reference frame to produce a first-pass reference for use in the first pass encoding of the first game frame. In any event, the second-pass reference frame is used as a basis for a first-pass reference frame when performing the first pass encoding so that the second-pass reference frame forms a shared reference frame used not only in the second pass encoding but also for the first pass encoding. The method can further include performing the first pass encoding on a first game frame of a stream of game frames at the first-pass resolution using the shared reference frame to determine an estimated complexity of the first game frame. The method can additionally include performing the second pass encoding on the first game frame at the second-pass resolution using the second-pass reference frame and according to the estimated complexity to generate an encoded frame. Accordingly, the proposed method can additionally include performing the second pass encoding on the first game frame at the second-pass resolution using the second-pass reference frame and the estimated complexity to generate an encoded frame. "Complexity" of a current frame, as used herein, refers to an amount or value of information in a current frame that differs from one or more reference frames associated with the current frame (e.g., reference frames used to encode the current frame). For example, the complexity of a current frame includes the difference in signal-to-noise ratio between a current frame and one or more reference frames, the difference in energy between the current frame and one or more reference frames, the difference in entropy between the current frame and one or more reference frames, or any combination thereof, to name a few. In this way, the higher the complexity of the current frame, the more information is required to encode.

In the method, retrieving the second-pass reference frame can include retrieving the second-pass reference frame from a memory buffer associated with the second pass encoding. Additionally, retrieving the second-pass reference frame can include, in response to the first-pass resolution being less than the second-pass resolution, downsampling the second-pass reference frame to the first-pass resolution to produce a downsampled reference frame and storing the downsampled reference frame in a second memory buffer associated with the first pass encoding to produce the shared reference frame. Retrieving the second-pass reference frame may also include, in response to the first-pass resolution being equal to the second-pass resolution, storing the second-pass reference frame in the second memory buffer associated with the first pass encoding to produce the shared reference frame.

In the method, the second-pass reference frame can be retrieved according to a pointer stored in a memory buffer associated with the first pass encoding. Further, the memory buffer can include a plurality of pointers each associated with a respective second-pass reference frame stored in a second-pass memory buffer associated with the second pass encoding.

In another example embodiment, a computer-implemented method can include producing a shared reference frame for use in a first pass encoding of a multi-pass encoding process based on a second-pass reference frame for use in a second pass encoding of the multi-pass encoding process. Producing the shared reference frame can include comparing a first-pass resolution of the first pass encoding to a second-pass resolution of the second pass encoding and downsampling the second-pass reference frame based upon the comparison of the first-pass resolution to the second-pass resolution. The method can also include performing the first pass encoding on a first game frame of a stream of game frames at the first-pass resolution using the shared reference frame and determining an estimated complexity of the first game frame based on the first pass encoding of the first game frame. Additionally, the method can include performing the second pass encoding on the first game frame at the second-pass resolution using the second-pass reference frame and based on the estimated complexity to generate an encoded frame.

In the method, producing the shared reference frame can also include accessing a memory buffer associated with the second pass encoding according to a pointer in a second memory buffer associated with the first pass encoding. The second memory buffer can include a plurality of pointers each associated with a respective second-pass reference frame stored in the memory buffer associated with the second pass encoding. Producing the shared reference frame can further include, in response to the first-pass resolution being less than the second-pass resolution, downsampling the second-pass reference frame to the first-pass resolution to produce a downsampled reference frame and storing the downsampled reference frame in the second memory buffer to produce the shared reference frame. Producing the shared reference frame can also include, in response to the first-pass resolution being equal to the second-pass resolution, storing the second-pass reference frame in the second memory buffer associated with the first pass encoding to produce the shared reference frame.

Generally, the first pass encoding can also include downsampling the first game frame to the first-pass resolution. Determining the estimated complexity of the first game frame based on the first pass encoding of the first game frame can also include determining a quantization parameter for the first game frame. The second pass encoding can further be performed based on the quantization parameter. Performing the first pass encoding may produce a first pass encoded frame having a bit size and determining the estimated complexity can further based on the bit size.

Further, generally, the first game frame may represent at least a portion of a virtual environment of a gaming session associated with a client system. Any method herein may also include encoding the stream of game frames according to the multi-pass encoding process so as to produce an encoded stream of game frames and transmitting the encoded stream of game frames to the client system. Any method herein can also include decoding the stream of game frames so as to produce a decoded stream of game frames and displaying the decoded stream of game frames. Further, any method herein may include rendering the stream of game frames according to a client gaming session associated with the client system.

According to example embodiments, a cloud-based gaming system can include one or more cloud-based gaming servers communicatively coupled to one or more client systems. Each cloud-based gaming server can include one or more processors and a memory coupled to the one or more processors and storing executable instructions configured to manipulate the one or more processors to perform one or more of the methods disclosed herein.

Additionally, as an example embodiment, a cloud-based gaming system can include a network interface couplable to a network and an encoder (e.g., of a gaming server of the gaming system) coupled to the network interface, the system configured to perform any method disclosed herein. Further, providing an additional example embodiment, a cloud-based gaming system can include an interface configured to receive an encoded frame (e.g., for a client system of the gaming system) encoded according to any method disclosed herein and one or more decoders configured to decode the encoded frame.

DETAILED DESCRIPTION

Techniques and systems described herein address the demands of providing a low-latency video stream from one or more cloud-based gaming servers to a client device while maintaining video quality. To this end, a cloud-based gaming server first renders a set of game frames for a gaming application and encodes the rendered game frames to produce a game stream. To better help ensure the game stream is close to a target bitrate, the cloud-based gaming server performs a multi-pass (e.g., two-pass) encoding operation when encoding each rendered game frame. Such a multi-pass encoding operation includes, for example, performing a first pass encoding on a game frame to estimate a complexity of the game frame and then performing a second pass encoding of the game frame based on the estimated complexity of the game frame. To this end, the cloud-based gaming server first performs a first pass encoding of a game frame by encoding the game frame using a first pass reference frame. Based on the result of the first pass encoding (e.g., a first-pass encoded frame), the cloud-based gaming server estimates a complexity of the game frame and determines a quantization parameter for the game frame based on the estimated complexity. The cloud-based gaming server then performs a second pass encoding of the game frame using a second pass reference frame and the quantization parameter (e.g., using the quantization parameter in the second pass encoding for determining a quantization step size) to produce a (e.g., second-pass) encoded game frame. To limit encoded game frames being assigned more bits than allowed (i.e., an overshoot) during encoding, the cloud-based gaming server uses one or more shared reference frames for the first pass encoding. That is to say, the cloud-based gaming server uses a shared reference frame for the first-pass encoding that is based on a second-pass reference frame (e.g., a reference frame used in the second pass encoding). In this way, the estimated complexity determined from the first pass encoding more accurately represents the actual complexity of the game frame. As such, the system can more accurately allocate the number of bits to encode each game frame which lessens the risk that the resulting stream will be larger than a network's bandwidth and minimizes packet loss over the network.

To facilitate understanding, the techniques of the present disclosure are described in the example context of a cloud gaming system. A cloud-based or other remote server renders a stream of video game frames representing the visual content of a video game instance being executed at that server or a related server, and then encodes each game frame using a multi-pass encoding process described herein to generate a bit stream representing a stream of encoded rendered game frames for transmission to one or more client devices via one or more networks. However, it will be appreciated that the systems and techniques described herein are not limited to this example context, but instead may be implemented in any of a variety of video stream encoding/decoding systems using the guidelines provided herein.

FIG. 1 illustrates a cloud-based gaming system 100 for single-player or multiplayer (including massively multiplayer) gaming, according to some embodiments. Cloud-based gaming system 100 includes one or more servers 102, with each server 102 communicatively coupled to one or more client systems 112 by at least one network 110. Network 110 is configured to allow for the transmission and reception of data between any of servers 102 and client systems 112 and includes, for example, wired and wireless networks, such as Ethernet, the Internet, Wi-Fi, or any combination thereof. In embodiments, each server 102 is communicatively interconnected via a high-bandwidth, low-latency inter-server messaging bus. Servers 102 are typically distributed in one or more data centers over a geographical area so as to reduce transmission latency through physical proximity. Though in the illustrated embodiment, three servers 102-1, 102-2, and 102-3 are presented supporting four client systems 112-1, 112-2, 112-3, and 112-4, in other embodiments, any number of servers may be implemented supporting any number of client devices. It will be appreciated that in a typical real-world implementation, the quantity of servers 102 and quantity of client systems 112 typically will be considerably higher than presented in the example of FIG. 1.

In the depicted embodiment, each server 102 includes a computing device such as, for example, a cloud server, virtual server, or any combination thereof configured to support one or more client gaming sessions executed on one or more client systems 112. A "client gaming session", as used herein, includes a gaming application being played, partially simulated, or fully simulated on client system 112. Each server 102 is configured to support this client gaming session by executing a corresponding game platform instance 104 that facilitates the execution of at least a portion of the gaming application being played, partially simulated, or fully simulated on the client system 112. Such facilitation can include performing one or more operations related to the gaming application, such as, for example, rendering one or more frames related to the gaming application, performing calculations related to the gaming application (e.g., lighting calculations, artificial intelligence calculation, physics calculations, shading calculations, input calculations, and the like), providing access to files, or any combination thereof, to name a few. The game platform instance 104 provides various software and hardware resources to achieve such facilitation, such as communication/network management, resource management, media rendering encoding, and the like. In this way, game platform instance 104 simulates the execution of one or more operations of the gaming application for a corresponding player as though that gaming application was being played on a local gaming device, such as a personal computer ("PC"), game console, smartphone, tablet computer, automotive entertainment system, and the like.

Each client system 112 represents the hardware and software resources utilized to receive player input through manipulation of one or more input/output devices for at least one player, as well as to present the video and audio content representing the visual and auditory content, respectively, of the gameplay for the at least one player. Examples of a client system 112 include one or more desktop computers, notebook computers, tablet computers, virtual-reality systems, augmented reality systems, a compute-enabled cellular phone (i.e., a "smartphone"), a compute-enabled television (i.e., a "smart TV"), or any combination thereof, to name a few. As illustrated with reference to client system 112-1, each client system 112 includes one or more client devices 116. In the illustrated embodiment, client system 112-1 comprises a first client device 116-1, which is communicatively coupled to, or otherwise associated with, display 118, at least one input device 120 (e.g., a gamepad, joystick, keyboard, mouse, touchscreen), one or more network interfaces configured to couple to the network connecting the client system 112 to a corresponding server 102, one or more processors, memory, storage, speakers, and other computing resources to render, process, and display scenes of a virtual environment. As illustrated with reference to client system 112-1, each client system 112 can include a decoder 114 configured to decode one or more frames related to a virtual environment. Decoder 114 can include hardware and software configured to decode one or more encoding streams (e.g., game streams 108) received from servers 102 so as to produce a decoded set of game frames or decoded stream. Each decoder 114 is configured to decode any encoded frame encoded by any method or process disclosed herein. In embodiments, client system 112-1 further comprises a smartphone client device 116-2, and a wearable virtual reality client device 116-3, each of which may operate as an integrated mobile computing device having input facilities, output facilities, display facilities, and communication facilities analogous to those noted above with respect to client system 112-1. In certain embodiments, client systems 112-1, 112-2, and 112-3 may include one or more facilities such as accelerometers, Global Positioning System (GPS) devices, and the like that are used to acquire motion data representing a movement of the client device, as well as a rate or acceleration of such movement.

While certain aspects described herein will be discussed with specific reference to cloud gaming scenarios, it will be appreciated that in certain embodiments the described techniques may be utilized in various non-gaming scenarios, such as if one or more of servers 102 and client systems 112 operate to render, process, and display other types of informational, educational, recreational and/or artistic content. It will therefore be further appreciated that while techniques are discussed herein with respect to the rendering of content that may utilize particular examples relevant to cloud gaming and gaming content, such discussions and techniques may be applied to such non-gaming scenarios. Examples provided herein may refer to scenarios involving the rendering, processing, and display of gaming content due to particular bandwidth and network latency issues relevant to such content and should not be construed to indicate that the techniques described are limited to those scenarios.

During operation, each server 102 executes a gaming platform instance 104 for one or more client gaming sessions. Executing game platform instance 104 includes rendering a set of game frames that includes one or more gaming frames associated with the gaming application being executed on one or more respective client systems 112. Each rendered gaming frame depicts at least a portion of a virtual environment used in the gaming application executed on the client system 112. For example, each rendered gaming frame can depict at least a portion of a virtual environment displayed on a display 118 of a client system 112 during the client gaming session.

Each server 102 is configured to encode each rendered gaming frame via encoder 106 so as to generate a respective encoded set of game frames (also referred to herein as "game stream" 108). Each server 102 is configured to encode a game stream 108 through, for example, compression, reorganization, and manipulation of each frame rendered by gaming platform instance 104. In embodiments, each encoder 106 of a server 102 implements one or more codecs so as to encode one or more rendered frames according to the one or more codecs. Such codecs can include H.264, H.265, VP9, AV1, or any combination thereof, to name a few. According to embodiments, each server 102 is configured to encode each frame rendered by gaming platform instance 104 using one or more shared reference frames for the first pass encoding that is based on one or more respective reference frames used in a second pass encoding. As discussed in detail below with reference to FIG. 3, this multi-pass encoding operation includes retrieving one or more reference frames associated with the second pass encoding to produce one or more respective shared reference frames, performing a first pass encoding on a game frame using one or more of the shared reference frames to estimate a complexity, and performing a second, subsequent encoding pass on the game frame according to the estimated complexity. Each resulting game stream 108 corresponds to a gaming application being executed on one or more client systems 112 and is provided to these corresponding client systems via network 110. The corresponding client systems 112 are each configured to decode a received game stream 108 via a decoder 114 and display the resulting decoded set of game frames 122 on, for example, a display 118. Each client system 112 is configured to decode a respective game stream 108 by compression, reorganization, and manipulation of the game frames within the encoded stream according to one or more various video codecs including lossless and lossy codecs. According to embodiments, each client system 112 includes a decoder that implements one or more codecs so as to decode a received game stream 108 according to the one or more codecs. Such codecs can include H.264, H.265, VP9, AV1, or any combination thereof, to name a few. Though three game streams 108-1, 108-2, 108-3 are depicted in the illustrated embodiment, in other embodiments, servers 102 can generate any number of game streams 108 each corresponding to one or more client gaming sessions.

Figure 2:
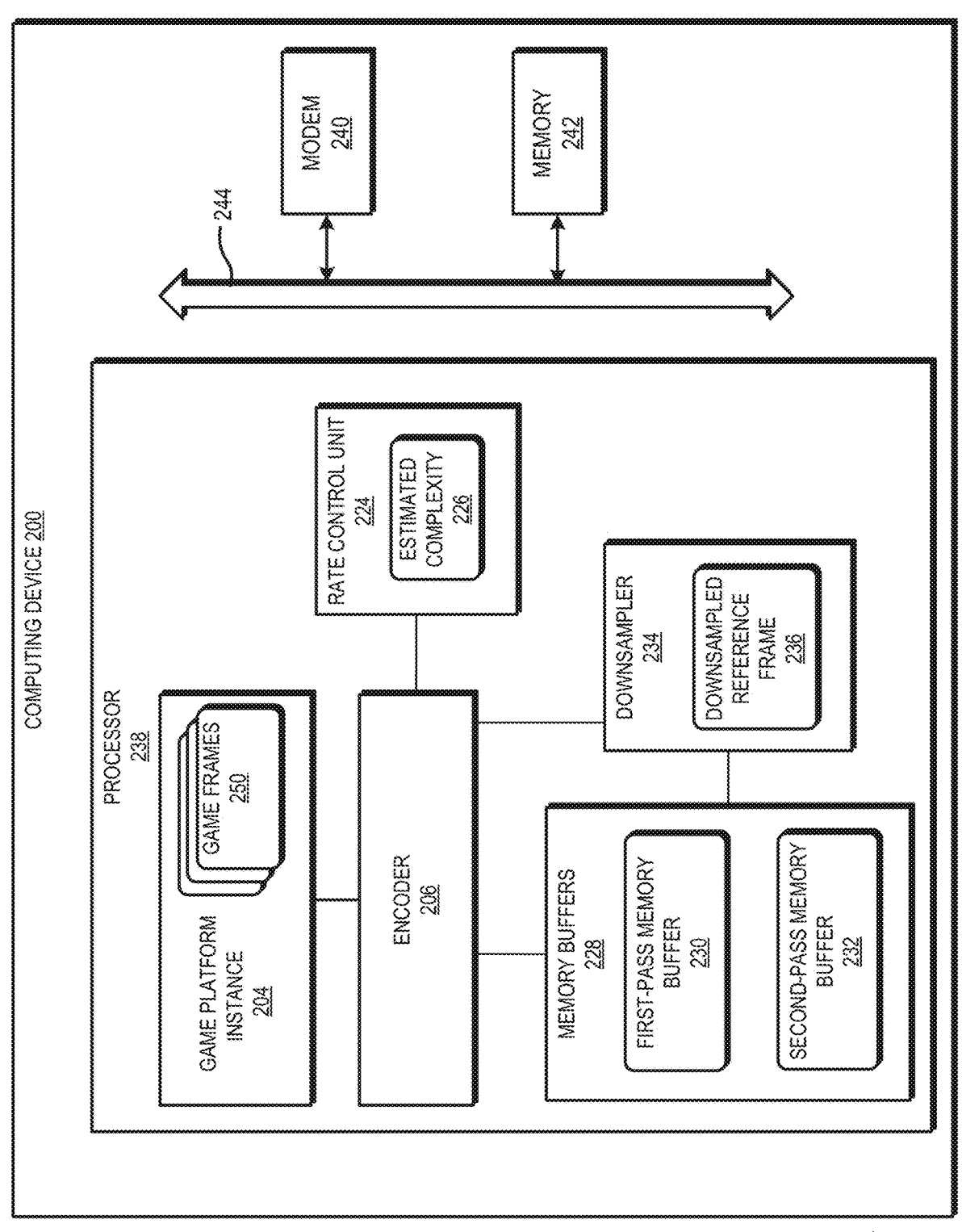
FIG. 2 is a block diagram of a computing device configured to encode and stream frames within a cloud-based gaming system, in accordance with some embodiments.

Referring now to FIG. 2, a computing system 200 configured to encode and stream frames within a cloud-based gaming system is illustrated. In embodiments, computing system 200 implements aspects of cloud-based gaming system 100 as described in FIG. 1. For example, computing system 200 may be similar or the same as a server 102 described in FIG. 1. Computing system 200 includes one or more software and hardware components for bi-directional communications including components for encoding a set of game frames 250 such as to produce a game stream 108. In some embodiments, computing system 200 is part of an electronic device that supports encoding of a set game frames 250, including, for example, a desktop computer, a notebook computer, a tablet, a server, a game console, to name a few. In embodiments, computing system 200 includes processor 238, modem 240, and memory 242. Memory 242 includes an electronic storage device, such as for example, a solid-state drive, a hard disk drive, random access memory ("RAM"), read-only memory ("ROM"), electronically erasable programmable ROM ("EEPROM"), optical storage device, or any combination thereof. Memory 242 includes instructions and data related to the operation of game platform instance 204, the encoder 206, downsampler 234, and rate control unit 224 such as, for example, codecs, reference frames, gaming engines, gaming applications, constants, and the like. Modem 240 is configured to be communicatively coupled to one or more client systems 112 via a network 110 and further configured to transmit a game stream 108 to the one or more client systems 112. According to embodiments, processor 238, modem 240, and memory 242 are internally in electronic communication via one or more interfaces (e.g., a bus 244).

According to embodiments, processor 238 includes one or more control processing units ("CPUs"), microprocessors, field-programmable gate arrays ("FPGAs"), graphics processing units ("GPUs"), application specific integrated circuits (ASICs), or any combination thereof and is configured to render and encode gaming frames for use in a client gaming session on cloud-based gaming system 100. Processor 238 operates to execute a game platform instance 204, the same or similar as game platform instance 104, associated with a current client gaming session and configured to support a gaming application executed on one or more client systems 112. Game platform instance 204 includes graphics hardware and software (not shown for clarity) to render a set of game frames 250 associated with an environment of the gaming application executed on the one or more client devices. Such graphics hardware and software include, for example, graphics cores, processing cores, pixel shaders, video random access memory ("VRAM"), GPUs, physics engines, lighting engines, tessellation engines, and the like. Each rendered game frame of the set of game frames 250 represents at least a portion of a virtual environment associated with the gaming application executed on the client device. For example, if the gaming application is a racing game, each game frame of the set of game frames 250 represents at least a portion of a racetrack, car, or surrounding area.

Game platform instance 204 provides each rendered game frame of the set of game frames 250 to encoder 206 for encoding into a game stream 108. Encoder 206 includes one or more software and/or hardware encoders configured to encode game stream 108 according to, for example, interframe and intraframe techniques. To reduce the bandwidth needed to transmit a game stream 108 between computing system 200 and one or more client systems 112, encoder 206 encodes game stream 108 by compressing one or more game frames of the set of game frames 250. Compressing a game frame includes comparing the game frame to one or more reference frames stored in memory buffers 228 and encoding one or more of the differences between the game frame and the one or more reference frames into game stream 108. Encoder 206 is further configured to encode the reference frames used into game stream 108. Further to match the available bandwidth, encoder 206 is configured to encode each frame according to a rate control scheme so that each encoded frame is compressed to be close in size to a predetermined target bit size. The rate control scheme is implemented by rate control unit 224 which includes one or more processors, hard-coded logic, programmable logic, or combination thereof, configured to control, or adjust, the bitrate and a number of respective bits (i.e., degree of compression) at which to encode a current frame of the set of game frames 250. Rate control unit 224 controls or adjusts the bitrate and the number of respective bits by determining an appropriate quantization parameter ("QP") for the current frame as a function of the complexity of the current frame. "Complexity" of a current frame, as used herein, refers to an amount or value of information in a current frame that differs from one or more reference frames associated with the current frame (e.g., reference frames used to encode the current frame). For example, the complexity of a current frame includes the difference in signal-to-noise ratio between a current frame and one or more reference frames, the difference in energy between the current frame and one or more reference frames, the difference in entropy between the current frame and one or more reference frames, or any combination thereof, to name a few. In this way, the higher the complexity of the current frame, the more information within the game frame encoder 206 is required to encode. As such, it is important that rate control unit 224 determines a QP high enough so as to help prevent the resulting encoded frame from having a number of bits larger than a predetermined target size related to the target bitrate. A person of ordinary skill in the art will appreciate that a QP determined this way causes more aggressive quantization of details for a current frame with a high complexity, resulting in an encoded frame with a reduced number of encoded bits. Similarly, for a current frame with a low complexity, encoder 206 has less new information to encode, and thus a QP can be chosen for less aggressive quantization while still reducing the risk of a potential overshoot.

In embodiments, rate control unit 224 determines a QP for a current frame according to the equation:

$$t = (a_1/QP + a_2/QP^2) * c \qquad \text{[EQ1]}$$

wherein t represents a predetermined, desired frame size, or degree of compression, for an encoded frame, $a_1$ and $a_2$ represent predetermined constants derived from past encoded frames, and c represents a complexity, or distortion, of the current frame. For example, c represents a complexity indicating the difference in signal-to-noise ratio between the current frame and one or more reference frames, the difference in energy between the current frame and one or more reference frames, the difference in entropy between the current frame and one or more reference frames, or any combination thereof.

According to embodiments, encoder 206 determines a complexity for a current frame by performing a multi-pass encoding operation. The multi-pass encoding operation includes performing a first pass encoding of a current frame of the set of game frames 250 using one or more shared reference frames retrieved from a first-pass memory buffer 230. In embodiments, the first pass encoding is performed at a first-pass resolution (e.g., a predetermined resolution). According to embodiments, performing the first pass encoding at a first-pass resolution includes downsampler 234 reducing the resolution of the current frame, shared reference frames, or both, to the first-pass resolution. In embodiments, the first pass encoding is performed according to a predetermined first-pass QP determined from one or more codecs implemented by the encoder 206. According to embodiments, performing the first pass encoding on the current frame results in a first pass encoded frame having a bit size. After the first pass encoding, rate control unit 224 determines an estimated complexity 226 for the current frame as a function of the bit size of the first pass encoded frame.

frame. The multi-pass encoding operation further includes a second pass encoding of the current frame using one or more second-pass reference frames retrieved from a second-pass memory buffer 232. According to embodiments, encoder 206 performs the second pass encoding at a second-pass resolution. That is to say, the current frame and second-pass reference frames are at the second-pass resolution when encoder 206 performs the second pass encoding on the current frame. In some embodiments, rate control unit 224 calculates a quantization parameter for the current frame as a function of estimated complexity 226. Rate control unit 224 then passes quantization parameter to encoder 206 which determines a corresponding quantization step-size. Encoder 206 uses this quantization step-size to control or adjust output bits when encoding the current frame.

In embodiments, to determine the estimated complexity 226 more accurately, the encoder 206 is configured to use one or more shared reference frames for the first pass encoding. A shared reference frame includes, for example, a reference frame based on a respective second-pass reference frame used in the second pass encoding of a current frame. According to embodiments, encoder 206 produces one or more shared reference frames for a first-pass memory buffer 230 including one or more pointers each associated with a current frame of the set of game frames 250. For a current frame, an associated pointer includes a location of a respective second-pass reference frame in second-pass memory buffer 232 (e.g., a second-pass reference frame used in the second pass encoding of the current frame). In embodiments, to produce a shared reference frame, encoder 206 is configured to retrieve a second-pass reference frame from the second-pass memory buffer 232 according to an associated pointer in the first-pass memory buffer 230. Retrieving the second-pass reference frame includes storing the second-pass reference frame in the first-pass memory buffer 230 so as to produce the shared reference frame for use in the first pass encoding. In other words, retrieving the second-pass reference frame includes storing the second-pass reference frame in the first-pass memory buffer 230 and using the second-pass reference frame also in the first pass encoding so that the second-pass reference frame forms the shared reference frame used (without adaptions or with adaptions, e.g., due to a downsampling) in the both the second pass encoding and the first pass encoding.

According to embodiments, the encoder 206 is configured to compare the first-pass resolution of the first pass encoding for the current frame to the second-pass resolution of the second pass encoding for the current frame. In response to the first-pass resolution being less than the second-pass resolution, downsampler 234 is configured to downsample a second-pass reference frame associated with the current frame to the first-pass resolution so as to produce a downsampled reference frame 236. That is to say, in response to the first-pass resolution being less than the second-pass resolution, downsampler 234 is configured to downsample a second-pass reference frame retrieved according to an associated pointer stored in first-pass memory buffer 230 to the first-pass resolution to produce a downsampled reference frame 236. Downsampler 234 includes one or more processors, hard-coded logic, programmable logic, or any combination thereof configured to downsample and compress one or more rendered game frames 250, shared reference frames, second-pass reference frames, or any combination thereof. In embodiments, encoder 206 is configured to store the downsampled reference frame 236 in first-pass memory buffer 230 to produce a shared reference frame for use in the first pass encoding.

Figure 3:
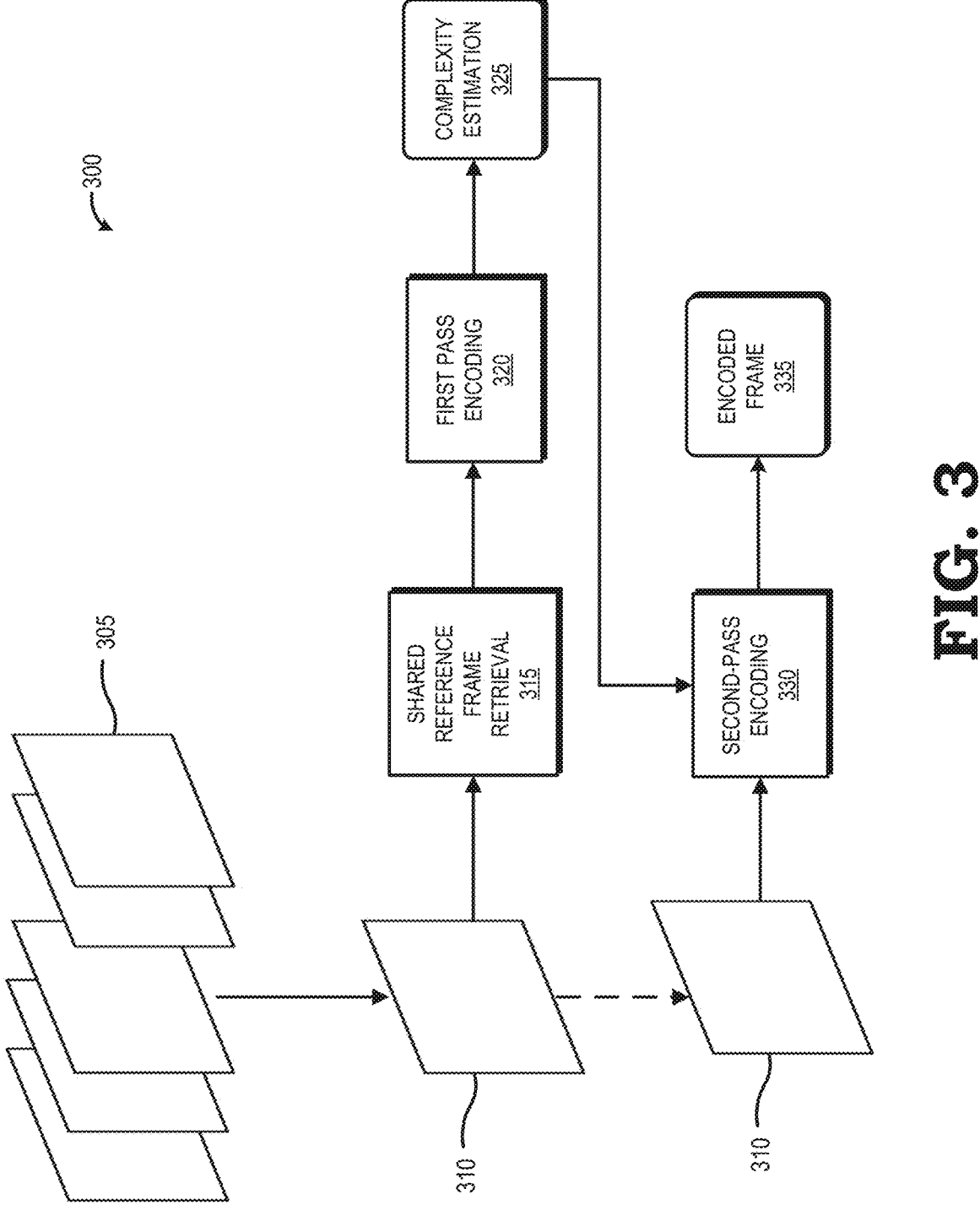
FIG. 3 is a flow diagram illustrating a method for a multi-pass encoding of a game frame of a stream of game frames, in accordance with some embodiments.

Referring now to FIG. 3, an example multi-pass (e.g., two pass) encoding operation 300 using a shared reference frame is illustrated. For ease of illustration, the multi-pass encoding operation 300 is described with reference to the computing system 200 of FIG. 2 implemented as a server 102 in the cloud-based gaming system 100 of FIG. 1. In operation 300, the game platform instance 204 renders a set of game frames 305 for a client gaming session associated with a gaming application running on one or more client systems 112. Each frame of the set of game frames 305 represents at least a portion of a virtual environment related to the gaming application. To facilitate transmission of the set of game frames 305 to the client device executing the gaming application, the encoder 206 encodes each frame of the set of game frames 305 using a multi-pass encoding operation using one or more shared reference frames. In doing so, the amount of bandwidth needed to transmit the encoded set of game frames to the client device is more closely matched to the actual available bandwidth.

For a first game frame 310 of the set of game frames 305, the encoder 206 performs a shared reference frame retrieval 315 to produce one or more shared reference frames. The shared reference frame retrieval 315 includes retrieving one or more second-pass reference frames associated with the first game frame 310 from a second-pass memory buffer 232, i.e., the second-pass reference frames used in the second pass encoding 330 of the first game frame 310. In embodiments, the shared reference frame retrieval 315 includes the encoder 206 accessing a first-pass memory buffer 230 that includes one or more pointers associated with the first game frame 310. For example, a pointer related to the first pass encoding 320 of the first game frame 310. The pointers in the first-pass memory buffer 230 include the location of a respective second-pass reference frame stored in second-pass memory buffer 232. That is to say, the pointers in the first-pass memory buffer 230 each include the location of a respective second-pass reference frame used in the second pass encoding 330 of the first game frame 310. Based on these pointers, the encoder 206 is configured to retrieve the respective second-pass reference frames from the second-pass memory buffer 232 so as to produce one or more retrieved reference frames by initially accessing just the first-pass memory buffer 230. According to embodiments, the shared reference frame retrieval 315 further includes the encoder 206 comparing the first-pass resolution used for the first pass encoding 320 of the first game frame 310 to the second-pass resolution used for the second pass encoding 330 of the first game frame 310. In embodiments, in response to the first-pass resolution being less than the second-pass resolution, downsampler 234 is configured to downsample the retrieved reference frames to the first-pass resolution to produce one or more downsampled (e.g., second-pass) reference frames. The encoder 206 then stores the downsampled (e.g., second-pass) reference frames in the first-pass memory buffer 230 to produce shared reference frames for use as first-pass reference frames in the first pass encoding 320 of the first game frame 310. In response to the first-pass resolution being equal to the second pass resolution, the encoder 206 stores the retrieved (e.g., second-pass) reference frames in the first-pass memory buffer 230 to produce shared reference frames for use in the first pass encoding 320 of the first game frame 310. In this way, the encoder 206 produces a shared reference frame based on the comparison of the first-pass resolution used for the first pass encoding 320 of the first game frame 310 to the second-pass resolution used for the second pass encoding 330 of the first game frame 310. That is to say, the encoder 206 produces a shared reference frame by storing the retrieved second-pass reference frames (e.g., as downsampled or not downsampled based on the comparison) in the first-pass memory buffer where they are made available as first-pass reference frames used in the first pass encoding 320 of the first game frame 310. By using second-pass reference frames also for the first pass encoding 320, second-pass reference frames are shared reference frames used in both the first and second pass encoding. Thereby, the complexity estimation 325 can more accurately estimate the complexity of the first game frame 310.

In embodiments, the first pass encoding 320 includes downsampling the first game frame 310, such as by downsampler 234 reducing the resolution of the first game frame 310 to the first-pass resolution. After downsampling the first game frame, the encoder 206 encodes the first game frame 310 using the second-pass reference frames, including shared reference frames resulting therefrom, and a predetermined (first) quantization parameter so as to result in a first pass encoded frame. After the first pass encoding 320, rate control unit 224 determines a complexity estimation 325 based upon the first pass encoded frame. By using the shared reference frame in the first pass encoding 320, the bit size of the first pass encoded frame may more accurately reflect the bit size of the encoded frame 335, improving the estimation of the complexity. In embodiments, rate control unit 224 determines the estimated complexity as a scaled factor version of the bit size of the first pass encoded frame.

After rate control unit 224 determines the estimated complexity from complexity estimation 325, the encoder 206 performs a second pass encoding 330 of the first game frame 310. Second pass encoding 330 includes determining a quantization parameter (e.g., second quantization parameter) for the first game frame 310 as a function of the estimated complexity from complexity estimation 325. From the determined quantization parameter (e.g., second quantization parameter) based on the second pass encoding, encoder 206 determines a quantization step-size used to encode the first game frame 310. The encoder 206 then performs second pass encoding 330 on the first game frame 310 according to the second-pass reference frames and at the determined (second) quantization parameter so as to produce encoded frame 335, with encoded frame 335 having a size close to a target bit size, such as, for example, t in EQ1. Improving the accuracy of the estimated complexity by using the shared reference frames in the first pass encoding 320 helps eliminate the potential for encoded frame 335 to have a bit size greater than the target bit size.

Figure 4:
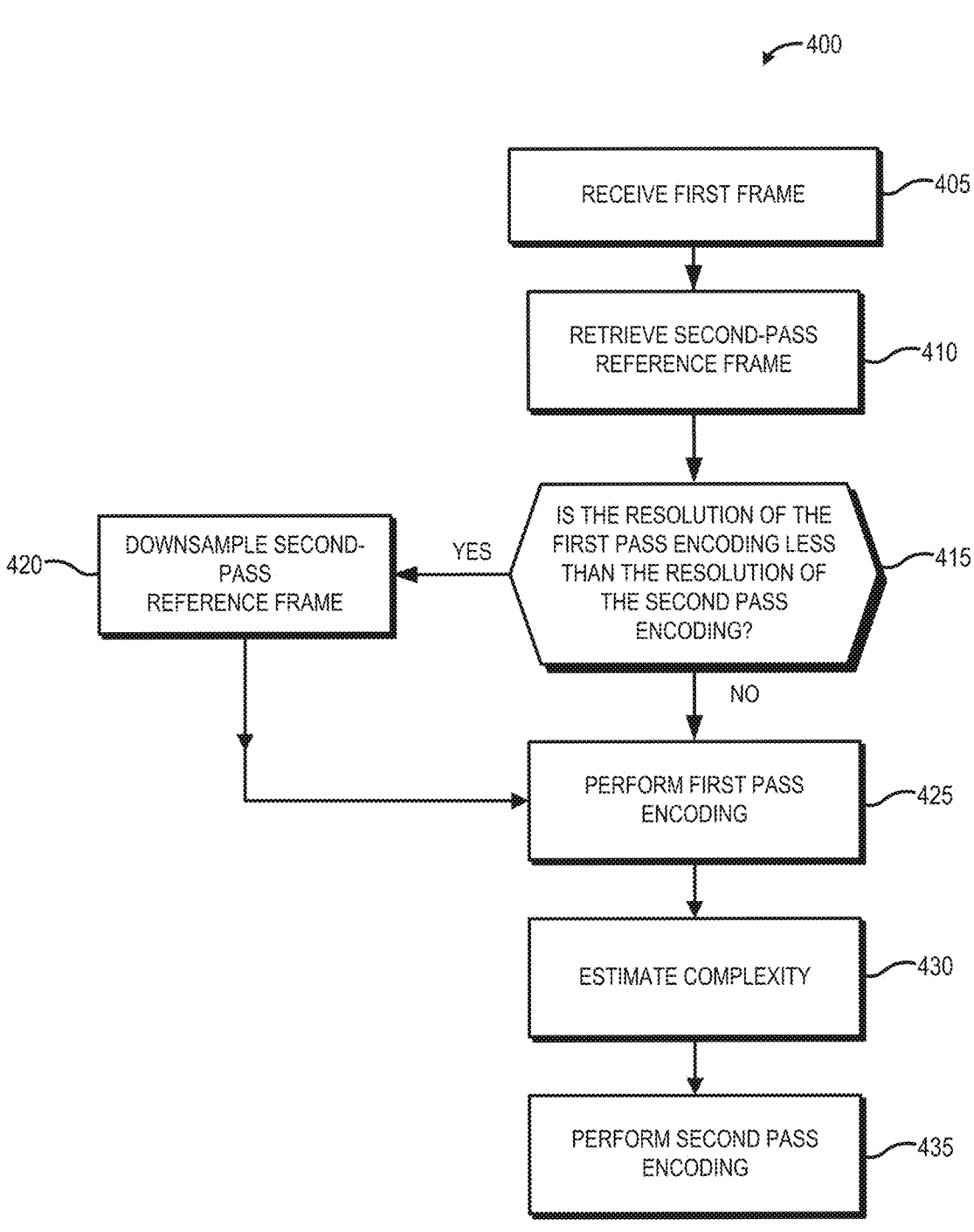
FIG. 4 is a diagram illustrating an example of a multi-pass encoding process using one or more shared reference frames, in accordance with some embodiments.

Referring now to FIG. 4, a method 400 for multi-pass encoding using a shared reference frame is illustrated. For ease of illustration, the method 400 is described with reference to the computing system 200 of FIG. 2 implemented as a server 102 of the system 100 of FIG. 1. At block 405, an encoder, the same or similar as the encoder 206, receives a first game frame. The first game frame represents at least a portion of a virtual environment associated with a client gaming session. At block 410, the encoder retrieves second-pass reference frames associated with the first game frame game from a second-pass memory buffer 232 to produce retrieved reference frames. For example, the encoder retrieves the second-pass reference frames used in the second pass encoding of the first gaming frame. In embodiments, retrieving the second-pass reference frames includes accessing the second-pass memory buffer 232 according to one or more pointers stored in a first-pass memory buffer 230. These one or more pointers stored in a first-pass memory buffer 230 include the location of the second-pass reference frames associated with the first game frame in the second-pass memory buffer 232.

At block 415, the encoder determines whether a first-pass resolution associated with a first pass encoding of the multi-pass encoding is less than the second-pass resolution associated with the second pass encoding of the multi-pass encoding. In response to the first-pass resolution being less than the second-pass resolution, the computing system 200 moves on to block 420. At 420, the downsampler 234 downsamples the retrieved reference frames to the first-pass resolution to produce downsampled reference frames. The encoder 206 then stores the downsampled reference frames in the first-pass memory buffer 230, producing shared reference frames for use in the first pass encoding of the first game frame. Referring again to block 410, in response to the first-pass resolution not being less than the second-pass resolution, the encoder stores the retrieved reference frames in the first-pass memory buffer 230, producing shared reference frames for use in the first pass encoding of the first game frame. The computing system 200 then moves on to block 425.

At block 425, the encoder performs a first pass encoding on the first game frame. In embodiments, the first pass encoding includes downsampler 234 downsampling the first game frame to the first-pass resolution, such as by decreasing the resolution of the first game frame to the first-pass resolution and encoding the first game frame using the shared reference frame. The first pass encoding produces a first pass encoded frame that has a number of bits. At block 430, a rate control unit, the same or similar as the rate control unit 224, determines an estimated complexity of the first game frame based upon the number of bits in the first pass encoded frame. Further at block 430, the rate control unit determines a quantization parameter for the first game frame according to the estimated complexity. By using the shared reference frames in the first pass encoding, the estimated complexity more accurately represents the actual complexity of the first game frame and lowers the risk of the encoded frame exceeding the target number of bits. At block 435, the encoder performs a second pass encoding operation on the first game frame using the second-pass reference frames and the determined quantization parameter.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:

comparing, by an encoder of a server, a first-pass resolution of a first pass encoding of a multi-pass encoding process to be performed by the encoder to a second-pass resolution of a second pass encoding of the multi-pass encoding process to be performed by the encoder;

producing a shared reference frame from a second-pass reference frame to be used in the second pass encoding based on the comparison;

performing, by the encoder, the first pass encoding on a first video frame of a set of video frames at the first-pass resolution using the shared reference frame to determine an estimated complexity of the first video frame; and performing, by the encoder, the second pass encoding on the first video frame at the second-pass resolution using the second-pass reference frame and according to the estimated complexity to generate an encoded frame to be included in a video stream transmitted by the server.

2. The method of claim 1, further comprising:

retrieving the second-pass reference frame from a memory buffer associated with the second pass encoding.

3. The method of claim 2, wherein producing the shared reference frame comprises:

in response to the first-pass resolution being less than the second-pass resolution, downsampling the second-pass reference frame to the first-pass resolution and storing the downsampled reference frame in a memory buffer associated with the first pass encoding to produce the shared reference frame.

4. The method of claim 1, further comprising:
in response to the first-pass resolution being equal to the second-pass resolution, storing the second-pass reference frame in a memory buffer associated with the first pass encoding to produce the shared reference frame.

5. The method of claim 1, further comprising:
retrieving the second-pass reference frame according to a pointer stored in a memory buffer associated with the first pass encoding.

6. The method of claim 5, wherein the memory buffer associated with the first pass encoding includes a plurality of pointers each associated with a respective second-pass reference frame stored in a second memory buffer associated with the second pass encoding.

7. A computer-implemented method, comprising:
producing, by an encoder of a server, a shared reference frame for use in a first pass encoding of a multi-pass encoding process to be performed by the encoder based on a second-pass reference frame for use in a second pass encoding of the multi-pass encoding process, wherein producing the shared reference frame comprises:
comparing a first-pass resolution of the first pass encoding to a second-pass resolution of the second pass encoding; and
downsampling, by the encoder, the second-pass reference frame based upon the comparison of the first-pass resolution to the second-pass resolution;
performing, by the encoder, the first pass encoding on a first video frame of a set of video frames at the first-pass resolution using the shared reference frame to determine an estimated complexity of the first video frame;
determining an estimated complexity of the first video frame based on the first pass encoding of the first video frame; and
performing, by the encoder, the second pass encoding on the first video frame at the second-pass resolution using the second-pass reference frame and the estimated complexity to generate an encoded frame to be included in a video stream transmitted by the server.

8. The method of claim 7, wherein producing the shared reference frame further comprises:
accessing a memory buffer associated with the second pass encoding according to a pointer in a second memory buffer associated with the first pass encoding.

9. The method of claim 8, wherein the second memory buffer includes a plurality of pointers each associated with a respective second-pass reference frame stored in the memory buffer associated with the second pass encoding.

10. The method of claim 8, wherein producing the shared reference frame further comprises:
in response to the first-pass resolution being less than the second-pass resolution, downsampling the second-pass reference frame to the first-pass resolution and storing the downsampled reference frame in the second memory buffer to produce the shared reference frame.

11. The method of claim 8, wherein producing the shared reference frame further includes:
in response to the first-pass resolution being equal to the second-pass resolution, storing the second-pass reference frame in the second memory buffer associated with the first pass encoding to produce the shared reference frame.

12. The method of claim 1, wherein the first pass encoding further comprises:
downsampling the first video frame to the first-pass resolution.

13. The method of claim 1, further comprising:
determining a quantization parameter for the first video frame.

14. The method of claim 13, wherein the second pass encoding is further performed based on the quantization parameter.

15. The method of claim 1, wherein performing the first pass encoding produces a first pass encoded frame having a bit size and wherein the estimated complexity is based on the bit size.

16. The method of claim 1, wherein the first video frame represents at least a portion of a virtual environment of a gaming session associated with a client system.

17. The method of claim 16, further comprising:
encoding the set of video frames according to the multi-pass encoding process so as to produce the video stream; and
transmitting the video stream to the client system.

18. The method of claim 17, further comprising:
decoding the video stream so as to produce a decoded set of video frames; and
displaying the decoded set of video frames.

19. The method of claim 18, further comprising:
rendering the set of video frames according to a client session associated with the client system.

20. The method of claim 1, wherein the first video frame on which the first pass and second pass encodings are performed is rendered.

21. The method of claim 1, further comprising encoding the first video frame according to a rate control scheme so that the encoded frame of the second pass encoding is compressed so as to comply with a predetermined target bit size.

22. A cloud-based video system comprising:
one or more cloud-based servers communicatively coupled to one or more client systems and each including:
one or more processors; and
a memory coupled to the one or more processors and storing executable instructions configured to manipulate the one or more processors to:
compare a first-pass resolution of a first pass encoding of a multi-pass encoding process to a second-pass resolution of a second pass encoding of the multi-pass encoding process;
produce a shared reference frame from a second-pass reference frame used in the second pass encoding based on the comparison;
perform the first pass encoding on a first video frame of a set of video frames at the first-pass resolution using the shared reference frame to determine an estimated complexity of the first video frame; and
perform the second pass encoding on the first video frame at the second-pass resolution using the second-pass reference frame and according to the estimated complexity to generate an encoded frame.

* * * * *